United States Patent
Krippner et al.

(10) Patent No.: US 7,284,437 B2
(45) Date of Patent: Oct. 23, 2007

(54) DEVICE AND METHOD FOR THE STATUS MONITORING OF A PRESSURE MEASURING UNIT

(75) Inventors: Peter Krippner, Karlsruhe (DE); Wolfgang Scholz, Minden (DE); Peter Riegler, Göttingen (DE); Emrullah Altiok, Minden (DE); Jürgen Biskup, Minden (DE); Wilhelm Daake, Petershagen (DE); Raiko Milanovic, Biethsstr (DE); Rolf Merte, Heidelberg (DE); Armin Gasch, Speyer (DE); Fabrizio Lorito, Mailand (IT); Andrea Moroni, Gorla Minora (IT); Franco Vecchiato, Lipomoco (IT); Corrado Bianchi, Lenno (IT); Eugenio Volonterio, Oltrona San Mamette (IT)

(73) Assignee: ABB Research Ltd, Zurich (CH)

( * ) Notice: Subject to any disclaimer, the term of this patent is extended or adjusted under 35 U.S.C. 154(b) by 22 days.

(21) Appl. No.: 11/103,439

(22) Filed: Apr. 12, 2005

(65) Prior Publication Data
US 2005/0241363 A1    Nov. 3, 2005

(30) Foreign Application Priority Data
Apr. 21, 2004    (DE) ................ 10 2004 019 222

(51) Int. Cl.
*G01L 13/02* (2006.01)
(52) U.S. Cl. .......................................... 73/716; 73/736
(58) Field of Classification Search ................. 73/754, 73/716, 736
See application file for complete search history.

(56) References Cited

U.S. PATENT DOCUMENTS 3,995,493 A * 12/1976 Nishihara .................... 73/708
4,787,249 A * 11/1988 Duppui et al. ............... 73/708
5,396,802 A *  3/1995 Moss .......................... 73/722

FOREIGN PATENT DOCUMENTS

DE    34 04 634 A1    8/1985
DE    199 31 227 C2   1/2001

* cited by examiner

*Primary Examiner*—Andre J. Allen
(74) *Attorney, Agent, or Firm*—Buchanan Ingersoll & Rooney PC

(57) ABSTRACT

The invention relates to a device and a method for the status monitoring of a pressure measuring unit in an absolute or differential or relative pressure transducer, a pressure-sensitive element installed in the pressure measuring unit being impinged with at least one pressure generated by at least one membrane. During a defined diagnosis time interval, a testing element integrated in the pressure measuring unit is induced to undergo a change in volume, preferably by electrical activation. The pressure difference caused as a result in the pressure measuring unit is registered by a pressure-sensitive element. The curve registered during a diagnosis time interval is compared with a reference curve recorded with the pressure measuring unit intact. A fault indication is given if the deviations between the registered curve and the reference curve exceed predetermined tolerance values.

4 Claims, 2 Drawing Sheets

DEVICE AND METHOD FOR THE STATUS MONITORING OF A PRESSURE MEASURING UNIT

Figure 1:
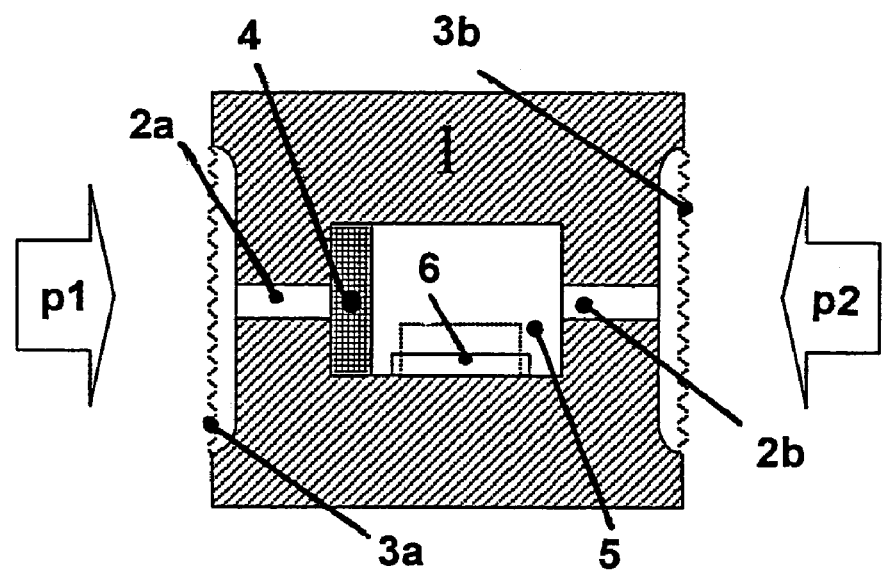

The invention relates to a device for the status monitoring of a pressure measuring unit in an absolute or differential or relative pressure transducer according to the preamble of claim 1. The invention also relates to a method for the status monitoring of a pressure measuring unit in an absolute or differential or relative pressure transducer according to the preamble of claim 3.

Pressure transducers are used in many industrial processes and in different forms as absolute or differential or relative pressure transducers, for example in the measurement of effective pressure or in the measurement of differences in levels in tanks. One problem is that a reliable measured value can only be formed with a pressure measuring unit of the pressure transducer that has remained unchanged since the last calibration, whereas the measured value that is formed is erroneous if there is any damage to the pressure measuring unit (for example impairment (tearing) of one or more separating membranes, deformations of the pressure measuring unit, corrosion with resultantly changing mechanical properties of the separating membranes, changes of the oil filling, formation of gas bubbles in the oil filling). To verify the trustworthiness of the measured values displayed, it is therefore often customary to provide redundant pressure transducers.

However, the use of a further pressure transducer for the verification of the actual sensor or pressure measuring unit generally has the disadvantage that a further measured value of a further (other) measuring element has to be trusted. Furthermore, the expenditure on apparatus increases greatly if further sensors have to be integrated, since they must also be evaluated. Depending on the configuration, the expenditure is considerable, in particular if a different measuring method has to be applied in the case of the further measuring element.

The invention is based on the object of providing a low-cost device for detecting changes of the properties of a pressure measuring unit leading to a falsification of the measured values.

The invention is also based on the object of providing a simple method for detecting changes of the properties of a pressure measuring unit leading to a falsification of the measured values.

This object is achieved according to the invention with regard to the device by the features specified in the defining part of claim 1 in combination with the features of the preamble.

This object is achieved according to the invention with regard to the method by the features specified in the defining part of claim 3 in combination with the features of the preamble.

The advantages which can be achieved with the invention are, in particular, that, with the proposed pressure measuring unit with an integrated testing element, something of a sensor self-diagnosis takes place. There is no need for a further sensor, along with an expensive evaluation device, but instead a reliable ascertainment of whether the properties of the pressure measuring unit have changed in an inadmissible way is obtained with the aid of the existing system.

Further advantages are evident from the description which follows.

Advantageous refinements of the invention are defined in the subclaims.

Figure 2:
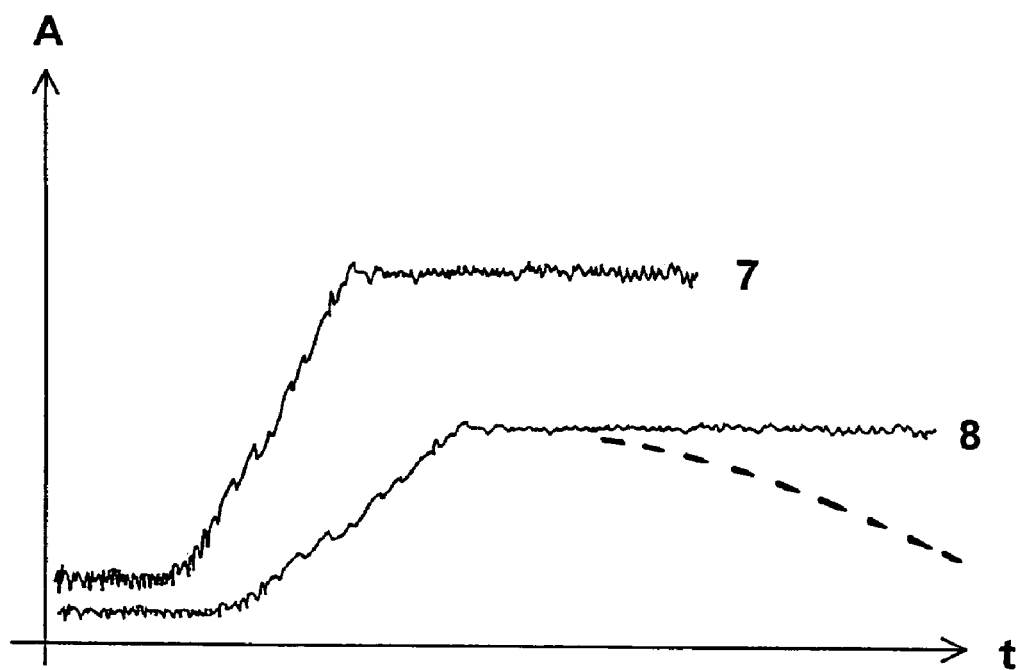
Figure 3:
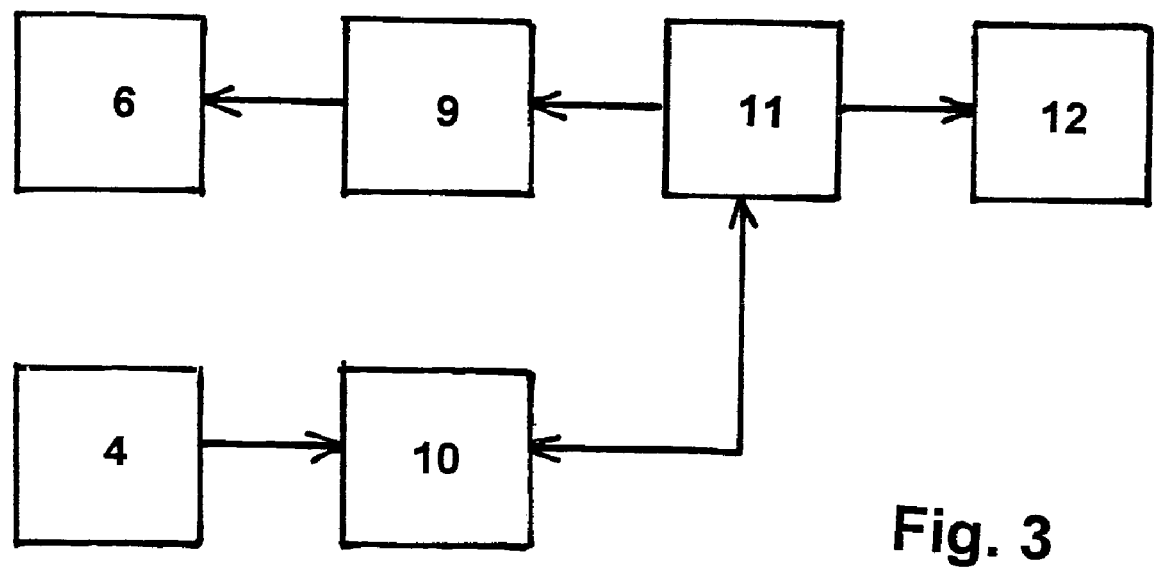

The invention is explained below on the basis of the exemplary embodiments that are represented in the drawing, in which:

FIG. 1 shows a schematic representation of a differential pressure transducer with an integrated testing element, FIG. 2 shows a time sequence of the sensor response to a mechanical load in the event of an incipient membrane tear, FIG. 3 shows a circuit arrangement for sensor self-diagnosis.

In FIG. 1, a schematic representation of a differential pressure transducer with an integrated testing element is illustrated. It shows a measuring cell or pressure measuring unit 1, which can respectively be impinged with a first pressure p1 and a second pressure p2 (which may be different from said first pressure) by means of a first membrane 3a and by means of a second membrane 3b, the two pressures p1, p2 acting on the membranes 3a, 3b simultaneously. The pressures respectively detected by means of the membranes 3a and 3b are passed simultaneously via a first liquid-filled channel 2a and a second liquid-filled channel 2b, respectively, into a common, likewise liquid-filled chamber 5. Oil is usually used as the liquid in the channels 2a, 2b and in the chamber 5. In the liquid-filled chamber 5 there is a pressure-sensitive element 4, usually consisting of a piezoresistive material or alternatively comprising a measuring cell of a capacitance or inductance that changes with changing pressure. Since the two pressures p1 and p2 act simultaneously on the pressure-sensitive element 4, only the pressure difference between the two pressures p1, p2 is registered by the pressure-sensitive element 4 (measuring sensor).

If a defect occurs at the pressure measuring unit 1 (for example tearing of one of the membranes 3, 3b), nothing changes—at least in the first instant—in the detection of the pressure difference, since only the mediating medium of the hydrostatic force has changed, i.e. a liquid (in the channel 2a or 2b and possibly in the chamber 5) has been exchanged for a gas (air) or another liquid. In addition, the mechanical properties of the separating membrane, in particular the restoring force, change. As a result, the change caused by a defect is manifested on the one hand by. a changed time response of the system due to changed compressibility of the filling. On the other hand, the response of the measuring cell to a defined change in volume of the space inside the pressure measuring unit (triggered by a testing element) also changes. The magnitude of the difference in differential pressure caused by a change in volume of a testing element differs significantly from that of an undamaged pressure measuring unit.

Therefore, the integration of a testing element 6 in the measuring cell or in the pressure measuring unit 1 or in the liquid-filled chamber 5 is important for the invention. The testing element 6 is preferably piezoelectric and can be induced to undergo changes in volume by applying an electrical voltage. The increase in volume in the liquid-filled chamber 5 brought about by the expansion is manifested as a pressure increase in the measuring cell 1, which is registered by the pressure-sensitive element 4.

So if there is damage to the pressure measuring unit 1, the mechanical load on the pressure-sensitive element 4 changes. For example, impairment of a membrane is generally manifested by a reduced mechanical load on the pressure-sensitive element 4. In other words, the change in pressure on the pressure-sensitive element 4 caused by the testing element 6 in the case of a specific increase in volume is greater with the membranes intact than with the membranes impaired. The cause of this is that an intact membrane has a defined mechanical stress, which has an influence on the measurement of the differential pressure. If the membrane is impaired, this defined mechanical stress is no longer present. In addition, the volume of liquid displaced by the testing element can flow out from the pressure measuring unit 1, so that, after this exchange process has subsided, the pressure detected by the pressure-sensitive element 4 reverts to the level before the change in volume.

In FIG. 2, a time sequence of the sensor response to the mechanical load in the event of an incipient membrane tear is represented. A "reference curve" recorded by the pressure-sensitive element 4 with the membranes 3*a*, 3*b* intact, a completely liquid-filled chamber 5 and completely liquid-filled channels 2*a*, 2*b* is represented by reference numeral 7, while a "detected curve" recorded by the pressure-sensitive element 4 with a defective membrane and/or inadequate liquid filling of the channels 2*a*, 2*b* and/or the chamber 5 is shown by reference numeral 8. The time t is entered on the horizontal axis, while the vertical axis indicates voltage values and/or current values and/or load values. A significant phase shift (including the perceptibly significantly different rates of increase) between the two curves 7 and 8 can be seen. If this phase shift between the reference curve 7 and the detected curve 8 exceeds a predetermined tolerance value, an incipient membrane tear and/or loss of liquid in channel 2*a* and/or channel 2*b* and/or liquid-filled chamber 5 is detected.

The actual value (amplitude) of the currently applied pressure p1 or p2 is in this case immaterial, since it is in particular the phase shift occurring and the change in pressure before and after the activation of the testing element 6 between the curves 7, 8 that are of interest for the sensor self-diagnosis.

As already mentioned above, in the same way as an incipient membrane tear, a leakage of the channels 2*a* and/or 2*b* and/or of the liquid-filled chamber 5 is established by the sensor self-diagnosis, since a loss of liquid (loss of oil) is accompanied by an exchange of oil for air or some other ambient gas. The different compressibility between the liquid (oil) and the gas or some other liquid in turn brings about a significant phase shift between the reference curve 7 and the detected curve 8, occurring in the sensor self-diagnosis.

As already mentioned above, when a volume of liquid flows out from the pressure measuring unit 1, the detected curve 8 can revert to the level before the change in volume, which is indicated by a curve trace shown by a broken line.

In FIG. 3, a circuit arrangement for self-diagnosis is represented. As can be seen, the testing element 6, formed here by way of example as a piezoelectric element, is connected to an energy feeding device 9 for supplying voltage/current.

The pressure-sensitive element 4 is connected to an evaluation device 10. A diagnosis control/evaluation 11 (with comparator and memory for storing the reference curve 7) serves for activating the energy feeding device 9 and the evaluation device 10.

At fixed time intervals T1, the diagnosis control 11 activates the energy feeding device 9, so that during a fixed diagnosis time interval T2 electrical energy impinges on the testing element 6. This brings about the aforementioned expansion in volume of the testing element 6. The evaluation device 10 registers the curve profile indicated by the pressure-sensitive element 4 during the time interval T2, as mentioned in the description relating to FIG. 2. The diagnosis control/evaluation 11 compares the currently indicated curve profile with the stored curve profile according to reference curve 7.

With the pressure measuring unit 1 intact, a registered curve similar to the reference curve 7 is obtained during the diagnosis time interval T2. If, however, changes have occurred at the pressure measuring unit 1 (such as for example tearing of one or more membranes 3*a* and/or 3*b* and/or there is a leakage in a channel 2*a* and/or 2*b* and/or a leakage in the liquid-filled chamber 5), a registered curve similar to the curve 8 according to FIG. 2 is obtained, in the case of which the phase shift and the pressure difference triggered by the change in volume in comparison with the reference curve 7 exceed a predetermined tolerance value. As a consequence, the diagnosis control/evaluation 11 acts on the display device 12, in order to indicate the faulty pressure measuring unit 1 (fault indication).

The measured value of the pressure measuring unit 1 (here a differential pressure transducer) occurring during the diagnosis time interval T2 is of course used only for the diagnosis, but is not used as a sensor signal for the higher-level measuring and control system.

In the case of a system with a multiplicity of pressure measuring units 1 (here differential pressure transducers), the energy feeding device 9, evaluation device 10, diagnosis control/evaluation 11 and display device 12 may be advantageously used for all the pressure measuring units 1, with successive impingement of the individual pressure measuring units.

The length of the diagnosis time interval T2 and the length of the time intervals T1 between two diagnoses can be varied in a wide range, criteria of the higher-level measuring and control system of course being taken into account.

The invention is explained above on the basis of the example of a differential pressure transducer. In the same way, the invention can also be used in the case of absolute pressure transducers and relative pressure transducers. In the case of the absolute pressure transducer, of course only one liquid-filled channel and one membrane are required. In the case of the relative pressure transducer, a pressure of interest (process pressure) is compared with the ambient pressure.

A piezoelectric element is used above as the testing element 6. It is alternatively possible also to use other testing elements, with which a change in volume can preferably be initiated and realized electrically. In the same way, the change in volume can of course also be initiated in a nonelectrical way, for example pneumatically.

LIST OF REFERENCE NUMERALS:

1 pressure measuring unit (measuring cell)
2*a* first liquid-filled channel
2*b* second liquid-filled channel
3*a* first membrane
3*b* second membrane
4 pressure-sensitive element
5 liquid-filled chamber
6 testing element
7 "reference curve" recorded by the pressure-sensitive element 4 with the membrane intact
8 "detected curve" recorded by the pressure-sensitive element 4 with a possibly defective membrane
9 energy feeding device
10 evaluation device
11 diagnosis control/evaluation
12 display device
A voltage and/or current and/or load values p1 first pressure
p2 second pressure
t time
T1 time interval between two impingements of the testing element 6
T2 diagnosis time interval of the impingement of the testing element 6

The invention claimed is:

1. A device for the status monitoring of a pressure measuring unit in an absolute or differential or relative pressure transducer, the device comprising: a pressure-sensitive element installed in the pressure measuring unit, the pressure-sensitive element being impinged with pressure, by means of at least one membrane, wherein a piezoelectric testing element which can be induced to undergo a change in volume by electrical activation is integrated in the pressure measuring unit, it being possible for the pressure difference caused as a result to be registered by the pressure-sensitive element and assessed by means for evaluating the pressure difference.

2. A device for the status monitoring of a pressure measuring unit in an absolute or differential or relative pressure transducer, the device comprising: a pressure-sensitive element installed in the pressure measuring unit, the pressure-sensitive element being impinged with pressure, by means of at least one membrane, wherein a piezoelectric testing element which can be induced to undergo a change in volume by electrical activation is integrated in the pressure measuring unit, it being possible for the pressure difference caused as a result to be registered by the pressure-sensitive element and assessed by means for evaluating the pressure difference, wherein a circuit arrangement for self-diagnosis is provided, with a diagnosis control/evaluation, which is connected to an energy feeding device for supplying the testing element, the diagnosis control/evaluation being connected to an evaluation device of the pressure-sensitive element, the diagnosis control/evaluation having a memory for storing a reference curve and a comparator for comparison of a curve currently measured by means of the pressure-sensitive element with the stored reference curve, and the diagnosis control/evaluation being connected to a display device for indicating a faulty pressure measuring unit.

3. A method for the status monitoring of a pressure measuring unit in an absolute or differential or relative pressure transducer, a pressure-sensitive element installed in the pressure measuring unit being impinged with at least one pressure, preferably by means of at least one membrane, wherein during defined diagnosis time intervals, a testing element integrated in the pressure measuring unit is induced to undergo a change in volume by preferably electrical activation, wherein the pressure difference caused as a result in the pressure measuring unit is registered by the pressure-sensitive element, wherein the curve registered during a diagnosis time interval is compared with a reference curve recorded with the pressure measuring unit intact, and wherein a fault indication is given if the deviations between the registered curve and the reference curve exceed a predetermined tolerance value.

4. A device for monitoring the status of a pressure measuring unit comprising:

a pressure sensitive element mounted on the pressure measuring unit;

at least one membrane that applies pressure to the pressure sensitive element;

a piezoelectric testing element integrated into the pressure measuring unit, wherein the testing element has an adjustable volume, wherein an adjustment of the volume is induced by electrical activation;

evaluation means for assessing the status of the pressure measuring unit; and wherein the pressure sensitive element registers a pressure difference in the pressure measure unit and the evaluation means assesses the status of the pressure measure unit when the volume of the testing element is adjusted.

* * * * *